United States Patent Office 3,772,317
Patented Nov. 13, 1973

3,772,317
CERTAIN 2-(3-SUBSTITUTED-4H-1,2,4-TRIAZOL-4-YL)-α-PHENYLBENZYLAMINES
Jackson B. Hester, Jr., Galesburg, Mich., assignor to The Upjohn Company, Kalamazoo, Mich.
No Drawing. Filed Aug. 18, 1971, Ser. No. 172,921
Int. Cl. C07d 55/06, 57/00
U.S. Cl. 260—308 R                3 Claims

ABSTRACT OF THE DISCLOSURE

Compounds of the formula

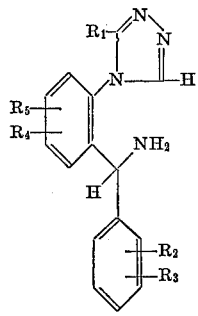

(IV)

wherein $R_1$ is selected from the group consisting of hydrogen, alkyl of 1 to 3 carbon atoms, inclusive, cycloalkyl of 3 to 8 carbon atoms, inclusive, phenyl, benzyl, —COOR′, in which R′ is alkyl defined as above, pyrimidyl, pyridyl, and pyrryl; wherein $R_2$, $R_3$, $R_4$, and $R_5$ are selected from the group consisting of hydrogen, alkyl defined as above, cyano, halo, trifluoromethyl, nitro, and alkoxy, alkylthio, alkylsulfinyl, alkylsulfonyl, alkanoylamino in which the carbon moiety is of 1 to 3 carbon atoms, inclusive, and dialkylamino in which alkyl is defined as above, are prepared by a multistep process from benzophenones of the formula

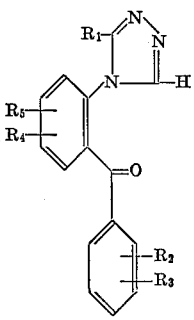

I

The compounds of Formula IV; their acid amide derivatives (III) and the analogous oximes (II) are active tranquilizing compounds. They are also intermediates in the production of other important tranquilizers and sedatives.

The acid addition salts of these compounds can be also used as tranquilizers and sedatives for mammals.

BACKGROUND OF THE INVENTION

Field of the invention

This invention is directed to new organic compounds and is particularly concerned with a process for 2-(3-substituted - 4H - 1,2,4 - triazol-4-yl)-α-phenylbenzylamines, intermediates and a process of production therefor.

The novel compounds and the process of production therefor can be illustratively represented as follows:

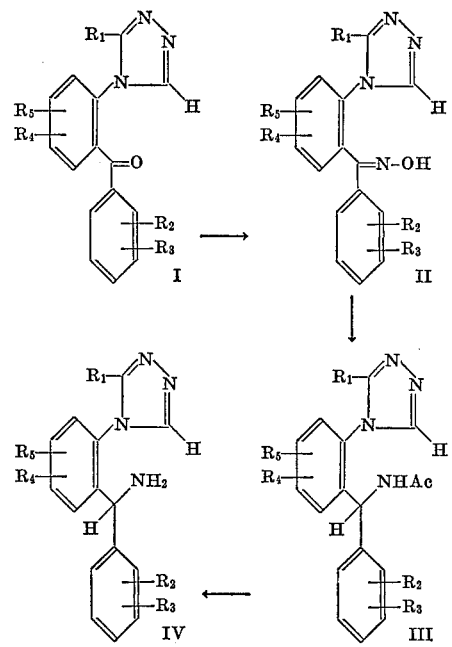

wherein $R_1$ is selected from the group consisting of hydrogen, alkyl of 1 to 3 carbon atoms, inclusive, cycloalkyl of 3 to 8 carbon atoms, inclusive, phenyl, benzyl, —COOR′, in which R′ is alkyl defined as above, pyrimidyl, pyridyl, and pyrryl; wherein $R_2$, $R_3$, $R_4$, and $R_5$ are selected from the group consisting of hydrogen, alkyl defined as above, cyano, halo, trifluoromethyl, nitro, and alkoxy, alkylthio, alkylsulfinyl, alkylsulfonyl, alkanoylamino in which the carbon moiety is of 1 to 3 carbon atoms, inclusive, and dialkylamino in which alkyl is defined as above, and wherein Ac is acyl selected from the group consisting of acetyl and propionyl.

The invention comprises also the acid addition salts of Compounds II, III, and IV.

The process of this invention comprises: treating a compound of Formula I with hydroxylamine or its hydrate or a salt thereof and a base to obtain the oxime II; heating II with zinc dust and an organic acid (acetic or propionic) to give the acylamide III, and refluxing III in a mineral acid to give the phenylbenzylamine IV.

DESCRIPTION OF THE PREFERRED EMBODIMENT

Lower alkyl groups of 1 to 3 carbon atoms, inclusive, are exemplified by methyl, ethyl, propyl, and isopropyl.
Cycloalkyl radical of 3 to 8 carbon atoms include cyclopropyl, cyclobutyl, cyclopentyl, cyclohexyl, cycloheptyl, and cyclooctyl.

The carbon chain moiety of alkoxy, alkylthio, alkylsulfinyl, alkylsulfonyl, and dialkylamino which is of 1 to 3 carbon atoms, inclusive, is defined in this invention like lower-alkyl of 1 to 3 carbon atoms, inclusive, above.

Thus, alkoxy can be methoxy, ethoxy, propoxy, and isopropoxy; alkylthio can be methylthio, ethylthio, propylthio, isopropylthio; alkylsulfinyl, can be methylsulfinyl, ethylsulfinyl, propylsulfinyl, and isopropylsulfinyl; alkylsulfonyl can be methylsulfonyl, ethylsulfonyl, propylsulfonyl, and isopropylsulfonyl; dialkylamino can be dimethylamino, diethylamino, dipropylamino, and diisopropylamino.

The alkanoylamino group of 1 to 3 carbon atoms consists of formamido

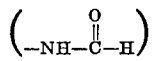

acetamido and propionamido.

Halogen signifies fluorine, chlorine, bromine, and iodine.

The novel compounds of the Formula II, III, and IV, and pharmacologically acceptable addition salts thereof of II, III, and IV and of the N-oxides have sedative, hypnotic, anticonvulsant, tranquilizing, and muscle relaxant effects in mammals and birds. Also as feed additives they increase growth rate and feed efficiency of livestock and poultry.

The pharmacologically acceptable acid addition salts of compounds of Formulae II, III, and IV, contemplated in this invention, are the hydrochlorides, hydrobromides, hydroiodides, sulfates, phosphates, cyclohexanesulfamates, methanesulfonates, phosphates, cyclohexanesulfamates, and the like, prepared by reacting a compound of Formulae II, III, and IV with the selected pharmacologically acceptable acid.

Sedative effects of 5-chloro-2-(3-methyl-4H-1,2,4-triazol-4-yl)-α-phenylbenzylamine are shown by the following tests in mice:

CHIMNEY TEST

[Med. Exp. 4, 145 (1961)]

The effective intraperitoneal dosage for 50% of mice ($ED_{50}$) is 16 mg./kg. The test determines the ability of mice to back up and out of a vertical glass cylinder within 30 seconds. At the effective dosage, 50% of the mice failed doing it.

DISH TEST

Mice in Petri dishes (10 cm. diameter, 5 cm. high, partially embedded in wood shavings), Climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 20 mg./kg.

PEDESTAL TEST

The untreated mouse leaves the pedestal in less than a minute to climb back to the floor of the standard mouse box. Tranquilized mice will stay on the pedestal for more than 1 minute. The $ED_{50}$ (intraperitoneal administration) is 10.0 mg./kg.

NICOTINE ANTAGONISM TEST

Mice in a group of 6 are injected with the test compound 5-chloro-2-(3-methyl-4H-triazol-4-yl)-α-phenylbenzylamine. Thirty minutes later the mice including control (untreated) mice are injected with nicotine salicylate (2 mg./kg.). The control mice show overstimulation, i.e., (1) running convulsions followed by (2) tonic extensor fits, followed by (3) death. An intraperitoneal dosage of 2.3 mg./kg. of the test compound protected 50% of the mice against (2) and 2.5 mg./kg. against (3) ($ED_{50}$).

The following compounds have $ED_{50}$ (by intraperitoneal injection) as shown in the table below:

| Compound | $ED_{50}$ (in mg./kg.) | | | |
|---|---|---|---|---|
| | Ch | D | P | Ni |
| 5-chloro-2-(3-methyl-4H-1,2,4-triazol-4-yl) benzophenone oxime | 16 | 126 | 159 | 40 |
| N-[5-chloro-2-(3-methyl-4H-1,2,4-triazol-4-yl)-α-phenylbenzyl]acetamide ethyl acetate solvate | 159 | 200 | 159 | 126 |

NOTE.—Ch=chimney test, D=dish test, P=pedestal test, Ni=nicotine antagonism (3) test.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g. coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour, and the like can be prepared. From 500 mg. to 50 g. of compounds of Formulae II, III, or IV per ton of feed is sufficient to increase body weight of livestock and poultry.

As tranquilizer the compounds of Formulae II, III, IV and its pharmacologically acid addition salts and N-oxides thereof can be used in dosages of 0.5–75 mg./kg. in oral rectal, or injectable preparations as described above, to alleviate tension and anxiety in mammals, or birds, such as e.g., occurs when animals are in travel.

Other acid addition salts of the compounds of Formulae II, III, and IV can be made such as the fluosilicic acid addition salts which are useful mothproofing compounds or the trichloroacetates useful as herbicides against Johnson grass, Bermula grass, yellow foxtail, and green foxtail, and quack grass.

Important benzodiazepines can be prepared from IV (intermediate) as shown in the examples.

The intermediates for this invention, triazolylbenzophenones I, are prepared as shown in the preparations.

In carrying out the process of this invention a selected triazolylbenzophenone I is treated with hydroxylamine, a hydroxyamine salt or hydroxylamine hydrate in an organic solvent e.g. an alkanol such as aqueous methanol, ethanol, 1-propanol, 2-propanol or the like. With a hydroxylamine salt a basic substance such as an alkali acetate, e.g. sodium or potassium acetate, an alkali carbonate, or bicarbonate, or the like is also employed. In the preferred embodiment of this reaction the reaction mixture is heated to the reflux temperature, but temperatures between 40° to reflux temperature are operative. The reaction time is between 2 and 24 hours, but longer periods are operative. At the termination of the reaction the oxime II thus produced is isolated and purified by conventional procedures, such as pouring the mixture into water, collecting the solids and crystallizing the solids. Extraction or chromatography can also be employed.

The thus obtained oximes II are converted to an amide (III) by treatment with a metal powder and an organic acid. In the preferred embodiment of this invention zinc dust and acetic or propionic acid are used, at elevated temperatures, 50° to the reflux temperature of the mixture. The reaction time is 2 to 48 hours. The products are obtained by conventional procedures such as pouring the mixture into water, collecting the solids and crystallizing the solids. Extraction or chromatography can also be employed.

The acid amide III thus obtained is hydrolyzed to the amine 2-(4H-1,2,4-triazol-4-yl)-α-phenylbenzylamine (IV) by a conventional procedure, i.e. by heating III with an aqueous mineral acid preferably aqueous hydrochloric acid. Heating III to reflux with aqueous hydrochloric acid (of 2–8 N strength) for 1 to 8 hours and allowing the mixture to stand, while cooling to room temperature for 2–24 hours is the preferred method of operation. Other acids, such as sulfuric, hydrobromic, and longer or shorter reaction periods can also be used and are operative. At the termination of the reaction the reaction mixture is neutralized, and the product is isolated and purified by conventional procedures, such as extraction, chromatography, crystallization and the like.

The following examples and preparations are illustrative of the processes and products of the present invention, but are not to be construed as limiting.

PREPARATION 1

2′-benzoyl-4′-chloroacetanilide

Acetyl chloride (81.3 g., 1.037 mole) was added to a stirred solution of 2-amino-5-chlorobenzophenone (200.0 g., 0.864 mole) and pyridine (68.4 g., 0.864 mole) in dry ether (4 l.); the mixture was kept at ambient temperature for 2 hours and treated with 500 ml. of water. The layers were separated and the ether layer was dried over anhydrous sodium sulfate and concentrated. Crystallization of the residue from ethyl acetate-Skellysolve B hexanes gave: 124.0 g. of 2′-benzoyl-4′-chloroacetanilide of melting point 114–115° C. Two more crops of 2′-benzoyl-4′-chloroacetanilide also were obtained: 67.8 g. of melting point 113.5–114.5° C. and 33.0 g. of melting point 113–114° C.

PREPARATION 2

6-chloro-4-phenyl-2(1H)-quinolone

The procedure (reaction of 2′-benzoyl-5′-chloroacetanilide with sodium hydroxide) of A. E. Drukker and C. I. Judd, J., Heterocyclic Chem. 3, 359 (1966) was used for this preparation. The yield was 77%. Two other preparations have been described: S. C. Bell, T. S. Sulkowski, C. Gochman and S. J. Childress, J. Org. Chem. 27, 562 (1962); G. A. Reynolds and C. R. Hauser, J. Amer. Chem. Soc. 72, 1852 (1950).

PREPARATION 3

2,6-dichloro-4-phenylquinoline

The procedure of A. E. Drukker and C. I. Judd, J. Heterocyclic Chem. 3, 359 (1966) was used for this preparation. The yield was 62%.

PREPARATION 4

6-chloro-2-hydrazino-4-phenylquinoline

A stirred mixture of 2,6-dichloro-4-phenylquinoline (2.7 g., 0.01 mole) and hydrazine hydrate (6.8 g.) was refluxed under nitrogen for 1 hour and concentrated in vacuo. The residue was suspended in warm water, and the solid was collected by filtration, dried and recrystallized from ethyl acetate-Skelly B hexanes to give 1.81 g. (67% yield) of 6-chloro-2-hydrazino-4-phenylquinoline of melting point 156.5–157° C.

*Analysis.*—Calcd. for $C_{15}H_{12}ClN_3$ (percent): C, 66.79; H, 4.49; Cl, 13.15; N, 15.58. Found (percent): C, 67.15; H, 4.65; Cl, 13.19; N, 15.32.

PREPARATION 5

7-chloro-1-methyl-5-phenyl-s-triazolo-[4,3-a]quinoline

A stirred mixture of 6-chloro-2-hydrazino-4-phenylquinoline (1.4 g., 0.0052 mole), triethyl orthoacetate (0.925 g., 0.0057 mole) and xylene (100 ml.) was refluxed, under nitrogen, for 2 hours 40 minutes. During this period the ethanol formed in the reaction was removed by distillation through a short, glass helix-packed column. The mixture was concentrated to dryness in vacuo and the residue was crystallized from methanol-ethyl acetate to give: 1.02 g. of 7-chloro-1-methyl-5-phenyl-s-triazolo-[4,3-a]quinoline of melting point 253.5–255° C. and 0.26 g. of melting point 253.5–255° C. (83.9% yield).

The analytical sample was crystallized from methylene chloride:methanol and had a melting point 252.5–253.5° C.

*Analysis.*—Calcd. for $C_{17}H_{12}ClN_3$ (percent): C, 69.50; H, 4.12; Cl, 12.07; N, 14.31. Found (percent): C, 69.39; H, 4.02; Cl, 12.10; N, 14.49.

PREPARATION 6

5-chloro-2-(3-methyl-4H-1,2,4-triazol-4-yl)-benzophenone (oxidation of 7-chloro-1-methyl-5-phenyl-s-triazolo[4,3-a]quinoline)

A stirred suspension of 7-chloro-1-methyl-5-phenyl-s-triazolo[4,3-a]quinoline (2.94 g., 0.01 mole) in acetone (110 ml.) was cooled in an ice-bath and treated slowly with a solution prepared by adding sodium periodate (2 g.) to a stirred suspension of ruthenium dioxide (200 mg.) in water (35 ml.). The mixture became dark. Additional sodium periodate (8 g.) was added during the next 15 minutes. The ice bath was removed and the mixture was stirred for 45 minutes. Additional sodium periodate (4 g.) was added and the mixture was stirred at ambient temperature for 18 hours and filtered. The solid was washed with acetone and the combined filtrate was concentrated in vacuo. The residue was suspended in water and extracted with methylene chloride. The extract was dried over anhydrous potassium carbonate and concentrated. The residue was chromatographed on silica gel (100 g.) with 10% of methanol-90% ethyl acetate; 50 ml. fractions were collected. The product was eluted in fractions 10–20 and was crystallized from ethyl acetate to give: 0.405 g. of melting point 168–169.5° C. and 0.291 g. of melting point 167.5–169° (23.4% yield) of 5-chloro-2-(3-methyl-4H-1,2,4-triazol-4-yl)benzophenone. The analytical sample had a melting point of 168° C.

*Analysis.*—Calcd. for $C_{16}H_{12}ClN_3O$ (percent): C, 64.54; H, 4.06; Cl, 11.91; N, 14.11. Found (percent): C, 64.56; H, 4.35; Cl, 11.97; 11.93; N, 14.29.

PREPARATION 7

Oxidation of 7-chloro-1-methyl-5-phenyl-s-triazolo [4,3-a]quinoline

A stirred suspension of 7-chloro-1-methyl-5-phenyl-s-triazolo[4,3-a]quinoline (2.94 g., 0.01 mole) and acetone (200 ml.) was cooled in an ice bath and treated, dropwise, during 15 minutes with a solution prepared from ruthenium dioxide (200 mg.), sodium periodate (4 g.) and water (35 ml.). A slight exothermic reaction was noted and the mixture became dark. After 10 minutes 29 ml. of a solution of sodium periodate (12 g.) in water (70 ml.) was added during 10 minutes. This mixture was stirred for 2 hours and then the remaining sodium periodate solution (41 ml.) was added during the next 3 hours. The mixture was concentrated in vacuo to remove acetone. The resulting aqueous mixture was extracted with methylene chloride. The extract was washed with water, dried over anhydrous magnesium sulfate, and concentrated. The residue was chromatographed on silica gel (150 g.) with 2% methanol-98% chloroform; 60 ml. fractions were collected. Recovered starting material was eluted in fractions 11–14 and crystallized from methanol-methylene chloride to give 0.069 g. of melting point 251.5–253.5° C. A mixture of the two products was eluted in fractions 15–39. Crystallization of this mixture from ethyl acetate gave 618 mg. (20.8%) of 5-chloro-2-(3-methyl-4H-1,2,4-triazol-4-yl)benzophenone of melting point 165.5–168°.

PREPARATION 8

Oxidation of 7-chloro-1-methyl-5-phenyl-s-triazolo [4,3-a]quinoline

A vigorous stream of ozone in oxygen was bubbled for 12 hours into a stirred, ice-cold solution of 7-chloro-1-methyl-5-phenyl-s-triazolo[4,3-a]quinoline (31.1 g., 0.106 mole) in methanol (750 ml.) and methylene chloride (500 ml.). The resulting mixture was filtered and the filtrate was added to an ice cold solution of sodium iodide (47.5 g.) and acetic acid (63 ml.) in water (200 ml.). The solution was decolorized by the addition of sodium thiosulfate and concentrated in vacuo. The residue was mixed with water and extracted with methylene chloride. The extract was washed ($H_2O$), dried over anhydrous magnesium sulfate and concentrated. The residue was chromatographed on silica gel (1.5 kg.); 175 ml. fractions were collected. Fractions 1–128 were eluted with 1% methanol-99% chloroform and fractions 129–168 with 5% methanol-95% chloroform. The first compound was eluted in fractions 49–60 and crystallized from methanol-ethyl acetate to give: 0.769 g. of melting point 229.5–231° (decomposition) and 0.535 g. of melting point 228° (decomposition) of 7-chloro-1-methyl-5-phenyl-s-triazolo[4,3-a]quinolin-4(5H)-one. The analytical sample had a melting point 232–233° C.

*Analysis.*—Calcd. for $C_{17}H_{12}ClN_3O$ (percent): C, 65.92; H, 3.91; Cl, 11.44; N, 13.57. Found (percent): C, 65.46; H, 3.72; Cl, 11.48; N, 13.59.

Recovered starting material was eluted in fractions 66–78 and crystallized from methylene chloride-methanol to give 0.737 g. of melting point 251–253.5° C. A mixture of the two remaining products was eluted in fractions 73–168. Crystallization of this mixture from ethyl acetate gave: 10.8 g. of melting point 166.5–167.5° C., 0.987 g. of melting point 166–167° C. and 2.52 g. of melting point 164–165.5° of 5 - chloro-2-(3-methyl-4H-1,2,4-triazol-4-yl)benzophenone.

PREPARATION 9

5-chloro-2-(3-methyl-4H-1,2,4-triazol-4-yl) benzophenone

A stirred solution of silver nitrate (0.357 g., 0.0021 mole) in water (1.8 ml.) was treated with 1 N sodium hydroxide (4.1 ml.). To the resulting stirred suspension of silver oxide was added a warm solution of 4-(2-benzoyl-4-chlorophenyl) - 5 - methyl - 4H - 1,2,4-triazole-3-carboxaldehyde methanol solvate (326 mg.) in methanol (15 ml.), and the resulting mixture was stirred under nitrogen at ambient temperature for 18 hours. The solid was collected by filtration and washed with water and methanol. The filtrate was concentrated in vacuo to remove methanol and the resulting aqueous solution was cooled in an ice bath, neutralized with hydrochloric acid and extracted with chloroform. The residue was crystallized from ethyl acetate to give 0.162 g. of 5-chloro-2-(3-methyl-4H - 1,2,4-triazol-4-yl)benzophenone of melting point 169.5–171° C.

PREPARATION 10

6-chloro-4-(2,6-difluorophenyl)-2-hydrazinoquinoline

In the manner given in Preparation 4, 2,6-dichloro-4-(2,6-difluorophenyl)quinoline was reacted at reflux with hydrazine hydrate to give 6-chloro-4-(2,6-difluorophenyl)-2-hydrazinoquinoline.

PREPARATION 11

7-chloro-1-methyl-5-(2,6-difluorophenyl)-s-triazolo [4,3-a]quinoline

In the manner given in Preparation 5, 6-chloro-4-(2,6-difluorophenyl)-2-hydrazinoquinoline and triethyl orthoacetate are refluxed in xylene to give 7-chloro-1-methyl-5-(2,6-difluorophenyl)-s-triazolo[4,3-a]quinoline.

PREPARATION 12

5-chloro-2',6'-difluoro-2-(3-methyl-4H-1,2,4-triazol-4-yl)benzophenone

In the manner given in Preparation 6, 7-chloro-1-methyl - 5 - (2,6-difluorophenyl)-s-triazolo[4,3-a]quinoline was oxidized at low temperature with sodium periodate and ruthenium dioxide to give 5-chloro-2',6'-difluoro-2-(3-methyl-4H-1,2,4-triazol-4-yl)benzophenone.

PREPARATION 13

6-chloro-4-(o-chlorophenyl)-2-hydrazinoquinoline

In the manner given in Preparation 4, 2,6-dichloro-4-(o-chlorophenyl)quinoline was reacted at reflux with hydrazine hydrate to give 6-chloro-4-(o-chlorophenyl)-2-hydrazinoquinoline.

PREPARATION 14

7-chloro-1-methyl-5-(o-chlorophenyl)-s-triazolo[4,3-a]quinoline

In the manner given in Preparation 5, 6 - chloro-4-(o-chlorophenyl)-2-hydrazinoquinoline and triethyl orthoacetate were refluxed in xylene to give 7-chloro-1-methyl-5-(o-chlorophenyl)-s-triazolo[4,3-a]quinoline.

PREPARATION 15

2',5-dichloro-2-(3-methyl-4H-1,2,4-triazol-4-yl)benzophenone

In the manner given in Preparation 6, 7-chloro-1-methyl-5-(o-chlorophenyl)-s-triazolo[4,3-a]quinoline was oxidized at low temperature with sodium periodate with ruthenium dioxide to give 2',5-dichloro-2-(3-methyl-4H-1,2,4-triazol-4-yl)benzophenone.

PREPARATION 16

5-nitro-6-propyl-4-(m-trifluoromethylphenyl)-2-hydrazinoquinoline

In the manner given in Preparation 4, 2-chloro-5-nitro-6-propyl-4-(m - trifluoromethylphenyl)quinoline was reacted at reflux with hydrazine hydrate to give 5-nitro-6-propyl - 4 - (m - trifluoromethylphenyl)-2-hydrazinoquinoline.

PREPARATION 17

6-nitro-7-propyl-1-ethyl-5-(m-trifluoromethylphenyl)-s-triazolo[4,3-a]quinoline

In the manner given in Preparation 5, 5-nitro-6-propyl-4-(m-trifluoromethylphenyl)-2-hydrazinoquinoline, and triethylorthopropionate were refluxed in xylene to give 6-nitro-7-propyl - 1 - ethyl-5-(m-trifluoromethylphenyl)-s-triazolo[4,3-a]quinoline.

PREPARATION 18

6-nitro-5-propyl-2-(3-ethyl-4H-1,2,4-triazol-4-yl)-3'-(trifluoromethyl)benzophenone In the manner given in Preparation 6, 6-nitro-7-propyl-1-ethyl-5-(m-trifluoromethylphenyl) - s - triazolo-[4,3-a]quinoline was oxidized at low temperature with sodium periodate with ruthenium dioxide to give 6-nitro-5-propyl-2-(3-ethyl - 4H - 1,2,4-triazol-4-yl)-3'-(trifluoromethyl)benzophenone.

In the manner given in the preceding preparations other benzophenones can be prepared such as:

3-trifluoromethyl-2-[3-(2-pyrimidyl)-4H-1,2,4-triazol-4-yl]benzophenone;
2',5-dichloro-2-[3-(4-pyridyl)-4H-1,2,4-triazol-4-yl]benzophenone;
5-nitro-2'-chloro-2-[3-(2-pyrryl)-4H-1,2,4-triazol-4-yl]benzophenone;
2',5-dinitro-2-(3-cyclopropyl-4H-1,2,4-triazol-4-yl)benzophenone;
3',3-dicyano-2-(3-propyl-4H-1,2,4-triazol-4-yl)benzophenone;
4',5,6-trimethyl-2-(3-isopropyl-4H-1,2,4-triazol-4-yl)benzophenone;
5-isopropyl-2',4'-dibromo-2-(3-cyclooctyl-4H-1,2,4-triazol-4-yl)benzophenone;
3,6-diethyl-3',5'-difluoro-2-(3-ethyl-4H-1,2,4-triazol-4-yl)benzophenone;

5-methylsulfonyl-2-(3-carboethoxy-4H-1,2,4-triazol-4-yl)benzophenone;
4-ethylsulfinyl-3'-cyano-2-[3-(2-pyrryl)-4H-1,2,4-triazo-4-yl]benzophenone;
3-propylthio-5-bromo-3'-trifluoromethyl-2-(3-ethyl-4H-1,2,4-triazol-4-yl)benzophenone;
4-dipropylamino-3'-propionamido-2-[3-(4-pyridyl)-4H-1,2,4-triazol-4-yl]benzophenone;
4,6-diethoxy-4'-ethyl-2-(3-isopropyl-4H-1,2,4-triazol-4-yl)benzophenone;
3,5,2',4'-tetramethylthio-2-(3-phenyl-4H-1,2,4-triazol-4-yl)benzophenone;
5-ethylsulfonyl-4'-nitro-2-(3-benzyl-4H-1,2,4-triazol-4-yl)benzophenone;
and the like.

EXAMPLE 1

5-chloro-2-(3-methyl-4H-1,2,4-triazol-4-yl)-benzophenone oxime

A stirred mixture of 5 - chloro-2-(3-methyl-4H-1,2,4-triazol-4-yl)benzophenone (2.98 g., 0.01 mole), hydroxylamine hydrochloride (1.39 g., 0.02 mole), sodium acetate (1.64 g., 0.02 mole), ethanol (50 ml.) and water (12.5 ml.) was refluxed under nitrogen for 20 hours. Additional hydroxylamine hydrochloride (0.70 g.) and sodium acetate (0.82 g.) were added and reflux was maintained for 13 hours 30 minutes. The cooled reaction mixture was poured into cold water and the solid was collected by filtration, washed with water and dried to give 2.94 g. of crude product. Crystallization of this material from methylene chloride-methanol gave 5-chloro-2-(3-methyl-4H-1,2,4-triazol - 4 - yl)benzophenone oxime (2.88 g.) of melting point 254.5° C. with decomposition. The analytical sample had a melting point of 253.5° C. with decomposition.

Analysis.—Calcd. for $C_{16}H_{13}ClN_4O$ (percent): C, 61.44; H, 4.19; Cl, 11.34; N, 17.92. Found (percent): C, 61.20; H, 3.89; Cl, 11.15; N, 16.49.

EXAMPLE 2

N-[5-chloro-2-(3-methyl-4H-1,2,4-triazol-4-yl)-α-phenylbenzyl]acetamide and its ethyl acetate solvate A mixture of 5-chloro-2-(3-methyl-4H-1,2,4-triazol-4-yl)benzophenone oxime (2.81 g., 8.98 mmoles), zinc dust (2.82 g.) and acetic acid (90 ml.) was refluxed under nitrogen for 6 hours, allowed to stand at ambient temperature for 18 hours and poured into water. This solution was neutralized (pH 8-9) with ammonium hydroxide and filtered. Both, the solid and the filtrate, were extracted with chloroform. The extract was washed with brine, dried over anhydrous magnesium sulfate and concentrated in vacuo. The residue was crystallized from ethyl alcohol-ethyl acetate to give 3.13 g. of N-[5-chloro-2-(3-methyl-4H-1,2,4-triazol-yl) - α - phenylbenzyl]acetamide ethyl acetate solvate of melting point 201.5–204.5° C. The analytical sample had a melting point of 202–203.5° C.

Analysis.—Calcd. for $C_{18}H_{17}ClN_4O \cdot \frac{1}{2}C_4H_8O_2$ (percent): C, 62.41; H, 5.50; Cl, 9.21; N, 14.56. Found (percent): C, 62.11; H, 5.44; Cl, 9.22; N, 14.60; EtOAc, 10.6.

Heating this product to 115–125° C. for 72 hours in vacuo (12–15 mm. Hg) produced the pure N-[5-chloro-2-(3-methyl - 4H - 1,2,4-triazol-4-yl)-α-phenylbenzyl]acetamide.

EXAMPLE 3

5-chloro-2-(3-methyl-4H-1,2,4-triazol-4-yl)-α-phenylbenzylamine

A solution of N-[5-chloro-2-(3-methyl-4H-1,2,4-triazol-4-yl)-α-phenylbenzyl]acetamide (2.38 g.) in 60 ml. of a solution of 6 N hydrochloric acid (30 ml.) and ethanol (60 ml.) was refluxed under nitrogen for 4 hours, 45 minutes, allowed to stand at ambient temperature for 18 hours and concentrated in vacuo to remove ethanol. The resulting aqueous solution was made alkaline with sodium hydroxide and extracted with chloroform. The extract was washed with brine, dried over anhydrous potassium carbonate and concentrated. Crystallization of the residue from ethylacetate-Skellysolve B hexanes gave 0.914 g. of 5-chloro-2-3-methyl - 4H - 1,2,4-triazol-4-yl)-α-phenylbenzylamine of melting point 146–148° C. The mother liquor was a mixture of starting material and product. It was concentrated, and the residue was mixed with 6 N hydrochloric acid (10 ml.) and ethanol (20 ml.) and refluxed on the steam bath under nitrogen, for 14 hours, 30 minutes. This mixture was worked up as above and the product crystallized from ethyl acetate to give additional 5-chloro-2-(3-methyl-4H-1,2,4-triazol-4-yl) - α - phenylbenzylamine: 0.596 g. of melting point 149.5–152.5° C. and 0.070 g. melting point 146.5–148° C. The analytical sample had a melting point of 149–150° C.

Analysis.—calcd. for $C_{16}H_{15}ClN_4$ (percent): C, 64.32; H, 5.06; Cl, 11.87; N, 1875. Found (percent): C, 64.53; H, 5.11; Cl, 11.92; N, 19.21.

EXAMPLE 4

5 - chloro - 2',6' - difluoro - 2 - (3 - methyl - 4H-1,2,4-triazol-4-yl)benzophenone oxime In the manner given in Example 1, 5-chloro-2',6'-difluoro-2-(3-methyl-4H-1,2,4-triazol - 4 - yl)benzophenone was refluxed with hydroxylamine hydrochloride, potassium acetate and aqueous ethanol to give 5-chloro-2',6'-difluoro-2-(3 - methyl - 4H - 1,2,4 - triazol - 4 - yl) benzophenone oxime.

EXAMPLE 5

N-[5-chloro-2-(3-methyl-4H-1,2,4-triazol-4-yl)-α-(2,6-difluorophenyl)benzyl]acetamide In the manner given in Example 2, 5-chloro-2',6'-difluoro - 2 - (3 - methyl - 4H - 1,2,4 - triazol - 4 - yl) benzophenone oxime was refluxed with zinc dust in acetic acid and the mixture was neutralized to give the product N-[5 - chloro - 2 - (3 - methyl - 4H - 1,2,4 - triazol-4-yl)-α-(2,6-difluorophenyl)benzyl]acetamide.

EXAMPLE 6

5-chloro-2-(3-methyl-4H-1,2,4-triazol-4-yl)-α-(2,6-difluorophenyl)benzylamine

In the manner given in Example 3, N-[5-chloro-2-(3-methyl-4H-1,2,4-triazol - 4 yl) - α - (2,6-difluorophenyl)benzyl]acetamide was refluxed in aqueous hydrochloric acid to give 5 - chloro - 2 - (3 - methyl - 4H - 1,2,4-triazol - 4 - yl) - α - (2,6 - difluorophenyl)benzylamine.

EXAMPLE 7

2',5',-dichloro-2-(3-methyl-4H-1,2,4-triazol-4-yl)benzophenone oxime

In the manner given in Example 1, 2',5-dichloro-2-(3-methyl - 4H - 1,2,4 - triazol - 4 yl)benzophenone was refluxed with hydroxylamine sulfate, potassium carbonate and aqueous methanol to give 2',5'-dichloro-2-(3-methyl-4H-1,2,4-triazol-4-yl)benzophenone oxime.

EXAMPLE 8

N-[5-chloro-2-(3-methyl-4H-1,2,4-triazol-4-yl)-α-(2-chlorophenyl)benzyl]propionamide In the manner given in Example 2, 2',5'-dichloro-2-(3-methyl - 4H - 1,2,4 - triazol - 4 - yl)benzophenone oxime was refluxed with zinc dust in propionic acid and the mixture was neutralized to give the product, N-[5-chloro-2-(3-methyl-4H-1,2,4-triazol - 4 - yl)-α-(2-chlorophenyl)benzyl]propionamide.

EXAMPLE 9

5-chloro-2-(3-methyl-4H-1,2,4-triazol-4-yl)-α-(2-chlorophenyl)benzylamine

In the manner given in Example 3, N-[5-chloro-2-(3-methyl-4H-1,2,4 - triazol - 4 - yl)-α-(2-chlorophenyl)benzyl]propionamide was refluxed in aqueous hydrochloric acid to give 5-chloro-2-(3-methyl-4H-1,2,4-triazol-4-yl)-α-(2-chlorophenyl)benzylamine.

EXAMPLE 10

6-nitro-5-propyl-3'-trifluoromethyl-2-(3-ethyl-4H-1,2,4-triazol-4-yl)benzophenone oxime In the manner given in Example 1, 6-nitro-5-propyl-3' - trifluoromethyl - 2 - (3 - ethyl - 4H - 1,2,4 - triazol-4-yl)benzophenone was refluxed with hydroxylamine hydrate, sodium acetate and aqueous ethanol to give 6-nitro-5-propyl-3'-trifluoromethyl - 2 - (3-ethyl-4H-1,2,4-triazol-4-yl)benzophenone oxide.

EXAMPLE 11

N-[6-nitro-5-propyl-2-(3-ethyl-4H-1,2-triazol-4-yl)-α-(3-trifluoromethylphenyl)benzyl]acetamide In the manner given in Example 2, 6-nitro-5-propyl-3'-trifluoromethyl - 2 - (3 - ethyl - 4H - 1,2,4 - triazol-4-yl)-benzophenone oxime was refluxed with zinc dust in acetic acid and the mixture was neutralized to give the product N-[6 - nitro - 5 - propyl - 2 - (3 - ethyl - 4H - 1,2,4-triazol - 4 - yl) - α - (3 - trifluoromethylphenyl)benzyl] acetamide.

EXAMPLE 12

6 - nitro - 5 - propyl - 2 - (3 - ethyl - 4H - 1,2,4-triazol-4-yl)-α-(3-trifluoromethylphenyl)benzylamine In the manner given in Example 3, N-[6-nitro-5-propyl-2-(3 - ethyl - 4H - 1,2,4 - triazol - 4 yl) - α - (3 - trifluoro-methylphenyl)benzyl]acetamide was refluxed in aqueous hydrochloric acid to give 6-nitro-5-propyl-2-(3-ethyl-4H-1,2,4-triazol - 4 - yl) - α - (3 - trifluoromethylphenyl) benzylamine.

EXAMPLE 13

2',5-dichloro-2-[3-(4-pyridyl)-4H-1,2,4-triazol-4-yl] benzophenone oxime

In the manner given in Example 1, 2',5-dichloro-2-[3-(4 - pyridyl) - 4H - 1,2,4 - triazol - 4 yl]benzophenone was refluxed with hydroxylamine hydrochloride, sodium bicarbonate and aqueous methanol to give 2',5-dichloro-2-[3-(4 - pyridyl) - 4H - 1,2,4 - triazol - 4 - yl]benzophenone oxime.

EXAMPLE 14

N-[5-chloro-2-[3-(4-pyridyl)-4H-1,2,4-triazol-4-yl]-α-(2-chlorophenyl)benzyl]acetamide In the manner given in Example 2, 2',5-dichloro-2-[3-(4 - pyridyl) - 4H - 1,2,4 - triazol - 4 yl]benzophenone oxime was refluxed with zinc dust in acetic acid and the mixture was neutralized to give the product N-[5-chloro-2 - [3 - (4 - pyridyl) - 4H - 1,2,4 - thiazol - 4 - yl]-α-(2-chlorophenyl)benzyl]acetamide.

EXAMPLE 15

5-chloro-2-[3-(4-pyridyl)-4H-1,2,4-triazol-4-yl]-α-(2-chlorophenyl)benzylamine

In the manner given in Example 3, N-[5-chloro-2-[3-(4-pyridyl)-4H-1,2,4-triazol - 4 - yl]-α-(2-chloro-phenyl)benzyl]acetamide was refluxed in aqueous hydrobromic acid to give 5-chloro-2-[3-(4-pyridyl)-4H-1,2,4-triazol-4-yl)-α-(2-chlorophenyl)benzylamine.

EXAMPLE 16

2',5-dinitro-2-(3-cyclopropyl-4H-1,2,4-triazol-4-yl)benzophenone oxime

In the manner given in Example 1, 2',5-dinitro-2-(3-cyclopropyl-4H-1,2,4-triazol-4-yl)benzophenone was refluxed with hydroxylamine hydrochloride, potassium acetate and aqueous ethanol to give 2',5,-dinitro-2-(3-cyclopropyl-4H-1,2,4-triazol-4-yl)benzophenone oxime.

EXAMPLE 17

N-[5-nitro-2-(3-cyclopropyl-4H-1,2,4-triazol-4-yl)-α-(2-nitrophenyl)benzyl]propionamide In the manner given in Example 2, 2',5-dinitro-2-(3-cyclopropyl - 4H - 1,2,4-triazol-4-yl)benzophenone oxime was refluxed with zinc dust in propionic acid and the mixture was neutralized to give the product, N-[5-nitro-2-(3-cyclopropyl-4H-1,2,4-triazol-4-yl)-α-(2 - nitrophenyl) benzyl]propionamide.

EXAMPLE 18

5-nitro-2-(3-cyclopropyl-4H-1,2,4-triazol-4-yl)-α-(2-nitrophenyl)benzylamine

In the manner given in Example 3, N-[5-nitro-2-(3-cyclopropyl - 4H-1,2,4-triazol-4H-1,2,4-triazol-4-yl)-α-(2-nitrophenyl)benzylamine.

In the manner given in Example 1 other oximes of benzophenones (1) can be produced such as:

3-trifluoromethyl-2-[3-(2-pyrimidyl)-4H-1,2,4-triazol-4-yl]benzophenone oxime;
5-nitro-2'-chloro-2-[3-(4-pridyl)-4H-1,2,4-triazol-4-yl]benzophenone oxime;
3,3'-dicyano-2-[3-propyl-4H-1,2,4-triazol-4yl] benzophenone oxime;
4',5,6-trimethyl-2-(3-isopropyl-4H-1,2,4-triazol-4-yl)benzophenone oxime;
5-isopropyl-2',4'-dibromo-2-(3-cycloctyl-4H-1,2,4 triazol-4-yl)benzophenone oxime;
3,6-diethyl-3',5'-difluoro-2-(3-ethyl-4H-1,2,4-triazol-4-yl)benzophenone oxime;
5-methylsulfonyl-2-(3-ethylcarboethoxy-4H-1,2,4-triazol-4-yl)benzophenone oxime;
4-ethylsulfinyl-3-cyano-2-[3-(2-pyrryl)-4H-1,2,4-triazol-4-yl]benzophenone oxime;
3-propylthio-5-bromo-4'-trifluoromethyl-2-(3-ethyl-4H-1,2,4-triazol-4-yl)benzophenone oxime;
4-dipropylamino-3'-propionamido-2-[-(3-pyridyl)-4H-1,2,4-triazol-4-yl]benzophenone oxime;
4,6-diethoxy-4'-ethyl-2-(3-isopropyl-4H-1,2,4-triazol-4-yl)benzophenone oxime;
3,5,2',4'-tetramethylthio-2-(3-phenyl-4H-1,2,4-triazol-4-yl)benzophenone oxime;
5-methylsulfonyl-4-nitro-2-(3-benzyl-4H-1,2,4-triazol-4-yl)benzophenone oxime;

and the like.

In the manner given in Example 2, other acid amides of benzophenones of Formula III can be produced, such as:

N-[3-trifluoromethyl-2-[3-(2-pyrimidyl)-4H-1,2,4-triazol-4-yl]-α-phenylbenzyl]acetamide;
N-[5-nitro-2-[3-(4-pyridyl)-4H-1,2,4-triazol-4-yl]-α-(2-chlorophenyl)benzyl]acetamide;
N-[3-cyano-2-(3-propyl-4H-1,2,4-triazol-4-yl)-α-(3-cyanophenyl)benzyl]acetamide;
N-[5,6-dimethyl-2-(3-isopropyl-4H-1,2,4-triazol-4-yl)-α-(4-methylphenyl)benzyl]acetamide;
N-[5-isopropyl-2-(3-cycloctyl-4H-1,2,4-triazol-4-yl)-α-(2,4-dibromophenyl)benzyl]acetamide;
N-[3,6-diethyl-2-(3-ethyl-4H-1,2,4-triazol-4-yl)-α-(3,5-difluorophenyl)benzyl]acetamide;
N-[5-methylsulfonyl-2-(3-carboethoxy-4H-1,2,4-triazol-4-yl)-α-phenylbenzyl]acetamide;
N-[4-ethylsulfinyl-3-cyano-2-[3-(2-pyrryl)-4H-1,2,4-triazol-4-yl]-α-phenylbenzyl]acetamide;
N-[3-propylthio-5-bromo-2-(3-ethyl-4H-1,2,4-triazol-4-yl)-α-(4-trifluoromethylphenyl)benzyl]acetamide;
N-[4-dipropylamino-2-[3-(3-pyridyl)-4H-1,2,4-triazol-4-yl)-α-(3-propionamidophenyl)benzyl]acetamide;
N-[4,6-diethoxy-2-(3-isopropyl-4H-1,2,4-triazol-4-yl)-α-[4-ethylphenyl)benzyl]acetamide;
N-[3,5-dimethylthio-2-(3-phenyl-4H-1,2,4-triazol-4-yl)-α-(2,4-dimethylthiophenyl)benzyl]acetamide;

N-[5-methylsulfonyl-4-nitro-2-(3-benzyl-4H-1,2,4-triazol-4-yl)-α-phenylbenzyl]acetamide;

and the like.

Likewise are prepared the propionamides of the above compounds using zinc dust and propionic acid on an oxime of Formula II above.

In the manner given in Example 3, other phenylbenzyl amines of Formula IV can be produced, such as:

3-trifluoromethyl-2-[3-(2-pyrimidyl)-4H-1,2,4-triazol-4-yl]-α-phenylbenzylamine;
5-nitro-2-[3-(4-pyridyl)-4H-1,2,4-triazol-4-yl]-α-(2-chlorophenyl)benzylamine;
3-cyano-2-(3-propyl-4H-1,2,4-triazol-4-yl)-α-(3-cyanophenyl)benzylamine;
5,6-dimethyl-2-(3-isopropyl-4H-1,2,4-triazol-4-yl)-α-(4-methylphenyl)benzylamine;
5-isopropyl-2-(3-cycloctyl-4H-1,2,4-triazol-4-yl)-α-(2,4-dibromophenyl)benzylamine;
3,6-diethyl-2-(3-ethyl-4H-1,2,4-triazol-4-yl)-α-(3,5-difluorophenyl)benzylamine;
5-methylsulfonyl-2-(3-carboethoxy-4H-1,2,4-triazol-4-yl)-α-phenylbenzylamine;
4-ethylsulfinyl-3-cyano-2-(3-(2-pyrryl-4H-1,2,4-triazol-4-yl)-α-phenylbenzylamine;
3-propylthio-5-bromo-2-(3-ethyl-4H-1,2,4-triazol-4-yl)-α-(4-trifluoromethylphenyl)benzylamine;
4-dipropylamino-2-[3-(3-pyridyl)-4H-1,2,4-triazol-4-yl]-α-(3-propionamidophenyl)benzylamine;
3,5-dimethylthio-2-(3-phenyl-4H-1,2,4-triazol-4-yl)-α-(2,4-dimethylthiophenyl)benzylamine;
5-methylsulfonyl-4-nitro-2-(3-benzyl-4H-1,2,4-triazol-4-yl)-α-phenylbenzylamine;

and the like.

Treating the compounds of Formulas II, III, and IV compounds with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids, produces the pharmacologically acceptable salts of compounds of Formula II, III, or IV which can be utilized like the free base compounds of Formula II, III, or IV. Salt formation is achieved in conventional manner by reacting the compounds of Formula II, III, or IV with excess of a selected acid in a suitable medium e.g. water, a lower alkanol, ether, or acetone and recovering the salt by evaporating the solvent, preferably in vacuo.

EXAMPLE 20

8-chloro-1-methyl-5,6-dihydro-6-phenyl-4H-s-triazolo[4,3-a][1,4]benzodiazepine 5-chloro-2-(3-methyl-4H-1,2,4-triazol-4-yl)-α-phenyl benzylamine (0.01 mole) and 0.011 mole of paraformaldehyde in 50 ml. of xylene (commercial grade) is heated to reflux temperature of a period of 10 hours. The mixture is cooled, concentrated in vacuo to give a crude product, which is purified by recrystallization to give pure 8-chloro-1-methyl-5,6-dihydro-6-phenyl-4H-s-triazolo[4,3-a][1,4]benzodiazepine of melting point 227–235° C.

EXAMPLE 21

8-chloro-1-methyl-6-phenyl-4H-s-triazolo-[4,3-a][1,4]benzodiazepine

A stirred mixture of 8-chloro-5,6-dihydro-1-methyl-6-phenyl-4H-s-triazolo[4,3-a][1,4]benzodiazepine (311 mg., 0.001 mole), diethyl azodicarboxylate (350 mg., 0.002 mole) and dry benzene (10 ml.) was refluxed, under nitrogen for 2 hours, 45 minutes, allowed to stand at ambient temperature for 18 hours and concentrated in vacuo. The semi-crystalline residue was washed with ether and the resulting solid was crystallized from ethyl acetate to give in two crops: 0.123 g. of melting point 228.5–230° C. and 0.053 g. of melting point 223–226° C. of 8-chloro-1-methyl-6-phenyl-4H-s-triazolo[4,3-a][1,4]benzodiazepine. The mixed melting point of the first crop with an authentic sample was undepressed; it was identical to the authentic sample.

In the same manner as given in Examples 20 and 21 other compounds of Formula IV can be converted the corresponding high activity triazolobenzodiazepines (of Belgian Pat. No. 747,493).

What is claimed is:

1. 5-chloro-2-(3-methyl-4H-1,2,4-triazol-4-yl)-α-phenylbenzylamine.

2. The acetyl derivative of the compound of claim 1, namely N-[5-chloro-2-(3-methyl-4H-1,2,4-triazolo-4-yl)-α-phenylbenzyl]acetamide.

3. 5-chloro-2-(3-methyl-4H-1,2,4-triazol-4-yl)-α-(2-chlorophenyl)benzylamine.

References Cited

Shriner et al., Identification of Organic Compounds (New York, 1948, 3rd ed.), pp. 202–203.

Wagner et al., Synthetic Organic Chemistry (New York, 1953), pp. 567, 658–659, 678–679, 739.

Weygand, Organic Preparations (New York, 1945), pp. 224–225, 264–265.

ALTON D. ROLLINS, Primary Examiner

U.S. Cl. X.R.

99—2 G, 2 T; 260—256.4 R, 256.5 R, 288 R, 294.8 G, 294.9, 295 R, 296, 562 B; 424—251, 269